United States Patent [19]

Nakatsuyama et al.

[11] 4,436,959
[45] Mar. 13, 1984

[54] AUTOMATIC TELEPHONE ANSWERING DEVICE

[75] Inventors: Takashi Nakatsuyama, Kawasaki; Yoshitomo Nakano, Tokyo, both of Japan

[73] Assignee: Sony Corporation, Tokyo, Japan

[21] Appl. No.: 268,189

[22] Filed: May 29, 1981

[30] Foreign Application Priority Data

Jun. 9, 1980 [JP] Japan .................................. 55-77483

[51] Int. Cl.³ .......................................... A04M 11/10
[52] U.S. Cl. .................................. 179/6.09; 179/6.11; 179/6.07; 369/50; 360/74.4; 360/74.2; 360/74.1
[58] Field of Search ..................... 179/6.07, 6.09, 6.11, 179/2 A; 360/72.3, 72.1, 72.2, 74.2, 74.1, 74.4, 60, 66; 369/28, 27, 24, 50

[56] References Cited

U.S. PATENT DOCUMENTS

| | | | |
|---|---|---|---|
| 3,863,029 | 1/1975 | Zimmermann | 179/6.07 |
| 4,120,006 | 10/1978 | Nogami | 360/72.2 |
| 4,309,571 | 1/1982 | Chamberlin | 179/6.09 |

*Primary Examiner*—Alan Faber
*Attorney, Agent, or Firm*—Lewis H. Eslinger; Alvin Sinderbrand

[57] ABSTRACT

An automatic telephone answering device employs a single magnetic tape and a single driving mechanism for driving the magnetic tape. Whenever an incoming call is received, a control circuit of the device sets the driving mechanism into a playback mode to play to the calling party an outgoing message recorded at the beginning of a track on the single magnetic tape. Then, if there have been no previously recorded incoming messages, the device records the calling party's incoming message after the end of the outgoing message. However, if any incoming messages have been recorded previously on the same track of the single magnetic tape, the tape is advanced at high speed to a point beyond the last of these previously-recorded incoming messages. Then, the present incoming message is recorded. As soon as the incoming call is ended, the device is set into a rewind mode. When the beginning of the recorded outgoing message is reached, the driving mechanism is stopped, and the device stands by to greet the next incoming call with the recorded message. In a preferred embodiment, a counter counts the rotations of a reel drive of the driving mechanism, and its contents are stored for points corresponding to the beginning and end of the outgoing message and the end of each recorded incoming message. The stored contents are then compared with the count on the counter during operation. A coder can be included to record a code identifying the sequence number of each incoming message.

19 Claims, 12 Drawing Figures

FIG.6

ICM ① -  -  -  -  -  -  -  -  -

ICM ② --  --  --  --  --  --  --  --  --

ICM ③ ---  ---  ---  ---  ---  ---  ---

ICM ⑥ -·  —·  —·  —·  —·  —·  —·

ICM ⑩ — —   — —   — —   — —   — —

ICM ⑪ — —·   — —·   — —·   — —·   — —·

AUTOMATIC TELEPHONE ANSWERING DEVICE

BACKGROUND OF THE INVENTION

1. Field of the Invention

This invention relates generally to magnetic recording and reproducing apparatus for automatic telephone answering devices with which a calling party is greeted by a recorded outgoing message, and any incoming message which the calling party desires to leave is recorded on a magnetic medium. In particular, this invention is directed to a telephone answering device in which a single magnetic tape and a single driving mechanism therefor are provided, and in which the outgoing message and the incoming messages are recorded in the same track on the magnetic tape.

2. Brief Description of the Prior Art

In many previously proposed telephone answering devices, two separate tapes are required: one for the recorded outgoing message and one for recording the incoming messages. A typical such device is disclosed in U.S. Pat. No. 3,445,600, to Leonard M. Todd. In this previously-proposed device, ringing current causes the device to seize the phone line, and also starts play of an endless tape on which a prerecorded outgoing message is recorded. After the endless tape has completed its cycle, a message recorder is started. This message recorder then records any incoming message on a separate tape. Because such a telephone answering device requires separate driving mechanisms for the two magnetic tapes, and also requires separate transducers and other ancillary equipment, this type of device is rather complicated, and therefore quite expensive. It is also quite difficult to construct such a device in a compact form.

One attempt to improve upon the above-mentioned device has been disclosed, for example, in U.S. Pat. No. 3,943,292, to M. Takazawa. This proposed device utilizes a single magnetic tape for both the outgoing message and the incoming messages, but requires a pair of magnetic heads that are spaced a sufficient distance apart so that when an incoming call is received, the first magnetic head picks up the recorded message on the tape and transmits it to the calling party, while, simultaneously, the recorded message picked up by the first head is transmitted to the second magnetic head. Thus, the recorded outgoing message is recorded repeatedly on the tape. The calling party's incoming message is then recorded in the space between the successive recordings of the outgoing message.

While this proposed device does indeed provide economy in that only a single tape and a single associated tape drive are required, because the device records the same outgoing message repeatedly, a great deal (about half) of the available length of the magnetic tape is wasted.

OBJECTS AND SUMMARY OF THE INVENTION

It is an object of this invention to provide an automatic telephone answering device which is free of the above defects of the prior art.

It is another object of this invention to provide an automatic telephone answering device which, by virtue of requiring only a single magnetic tape and only a single drive therefor, is relatively simple and inexpensive.

It is a further object of this invention to provide an automatic telephone answering device in which an outgoing message recorded at the beginning of a magnetic tape is reproduced for each incoming call, and in which incoming messages from successive calling parties are recorded, in sequence, on the same track of the magnetic tape.

According to one aspect of this invention, a telephone answering device includes a magnetic tape device having a stop mode, a rewind mode, a forward mode, and a fast-forward mode. This automatic telephone answering device operates by automatically coupling the tape device to an associated phone line upon detection of a ringing signal on the phone line; setting the device into its forward mode and playing a prerecorded outgoing message recorded in a track on the magnetic tape; after playing of the outgoing message, and if no previous incoming messages have been recorded, recording in the track any incoming message from the calling party, but, if there have been previously recorded any such incoming messages, setting the device into its fast-forward mode until the tape is driven beyond the last such previously-recorded incoming message, and then setting the device into its forward mode and recording the incoming message from the calling party; after termination of the incoming message, setting the device into its rewind mode; and then the tape has been rewound to a point corresponding to the beginning of the recorded outgoing message, setting the device into its stop mode, thereby conditioning the device to greet any subsequent calling party by playing back the recorded outgoing message.

In a favorable embodiment of this invention, an automatic telephone answering device includes a detector for detecting any incoming calls, and automatically coupling the device to the associated phone transmission line whenever an incoming call is detected; a transducer head for recording and picking up signals on a magnetic medium, such as magnetic tape; a drive mechanism for advancing the magnetic medium relative to the transducer head and which is capable of being set into a forward mode, a fast-forward mode, a rewind mode, and a stop mode; a measuring mechanism for measuring the elapsed length of the medium; and a control circuit, which can include a microprocessor, coupled to the drive mechanism and to the measuring mechanism for controlling the operation of the drive mechanism. With this device, quantities representing the measured elapsed length of the medium at least at the beginning and end of the outgoing message and at the end of each incoming message are stored, and during operation the measured elapsed length of the medium is compared with the stored quantities. The measuring mechanism can favorably comprise a pulse generator associated with the drive mechanism, for example, on a reel drive shaft if the medium is magnetic tape, and a counter for counting the pulses produced thereby.

When the device is first connected to the phone transmission line, the drive mechanism is set into its forward mode to play back the recorded outgoing message. When the measured elapsed length of the medium corresponds to the stored quantity representing the end of the outgoing message, and if there have been no previously recorded incoming messages, the device records any incoming message from the calling party, but if there have been previously recorded any such incoming messages, the drive mechansim is set into its fast-forward mode and the medium is advanced until the measured elapsed length thereof corresponds to the stored quantity representing the end of the last such previously recorded incoming message, following which the drive mechanism is set into its forward mode for recording the incoming message from the calling party. Then, following termination of the incoming call, there is stored a quantity representing the measured elapsed length of the medium at the end of the incoming message, and the drive mechanism is set into its rewind mode for rewinding the medium back to the beginning of the recorded outgoing message. When the measured elapsed length corresponds to the stored quantity representing the beginning of the outgoing message, the drive mechanism is set into its stop mode, thereby conditioning the device to greet any subsequent calling party by playing back the recording outgoing message.

These and other objects, features, and advantages of this invention will be appreciated from the ensuing description of preferred embodiments thereof, when read in conjunction with the accompanying drawings.

BRIEF DESCRIPTION OF THE DRAWINGS

FIG. 6 is a chart showing coded signal patterns used in third and fourth embodiments of this invention.

DETAILED DESCRIPTION OF THE PREFERRED EMBODIMENTS

Figure 1:
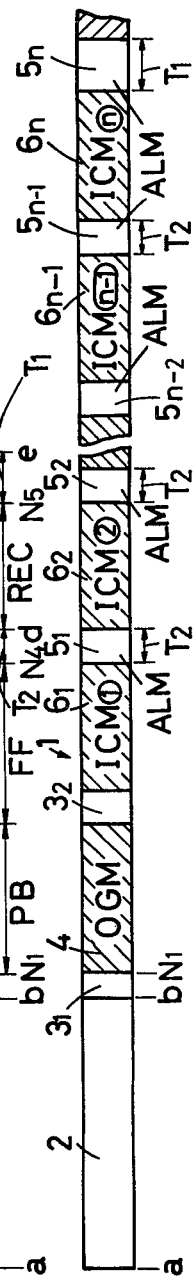
FIGS. 1A to 1F illustrate a magnetic tape as recorded by means of the telephone answering device of this invention.

The automatic telephone answering device, or telephone answering machine (TAM) embodying this invention automatically answers incoming calls and records any incoming messages in the manner generally illustrated in FIGS. 1A–1F of the accompanying drawings. The TAM employs a magnetic medium which can be formed as a tape cassette or microcassette, and which includes a magnetic tape 1 having a tape leader portion 2 extending from the head, or front end a to the junction b of the leader portion 2 with the remainder of the tape 1, as shown in FIG. 1A. When the tape 1 is loaded into the TAM, it is automatically rewound to the head a. Then, the tape 1 is fast-forwarded to the a position near, but in advance of position b. In a usual standard cassette tape, the length of the leader portion 2, from position a to position b, corresponds to about sixty seconds of tape when the TAM is in a forward-running mode (i.e., at normal speed). Then, as illustrated in FIG. 1B, the tape is erased beginning in advance of the position b and for approximately five seconds therebeyond to a position c to create a silent portion $3_1$.

In the embodiment described herein, the tape 1 is wound on a tape reel or hub, which rotates in one direction in order to advance the tape 1, and rotates in the opposite direction when the tape 1 is rewound. The number of rotations of the reel or hub are sensed, and are counted up as the tape is advanced and counted down as it is rewound.

At the end of the silent portion $3_1$, the number of rotations $N_1$, which corresponds to the beginning of an outgoing message, is stored.

Then, as illustrated in FIG. 1C, the outgoing message, or OGM 4 together with a control signal of, for example, a 30 Hz tone, is recorded. The time allotted for the recording of the OGM 4 and the associated control signal is established, for example, at thirty seconds. Following the OGM 4, the number of rotations $N_2$ corresponding to the end of the OGM 4 is stored. Then, the magnetic tape 1 is erased for approximately three seconds to a position d. Thus, a silent signal portion $3_2$ is created on the magnetic tape 1. Following this, the number of rotations $N_3$ corresponding to the end of the silent signal portion $3_2$ is stored.

After the OGM 4 has been recorded, the magnetic tape 1 is rewound until the counted-down number of rotations equals the stored number $N_1$. Then, the TAM stands by for an incoming call.

When the first incoming call is received, the OGM 4 is played, as shown in FIG. 1D. Then, after the silent portion $3_2$, an incoming message (ICM) $6_1$ from the first calling party is recorded from the position corresponding to the number of rotations $N_3$ to a subsequent position corresponding to the number $N_4$. The number $N_4$ is then stored as an indication of the end of the first ICM $6_1$, and an alarm tone is recorded immediately thereafter for a period $T_1$ (approximately three seconds) to form an alarm portion $5_1$. Thereafter, the tape is automatically rewound to the position 1, corresponding to $N_1$ rotations, and the TAM again stands by for the next incoming call.

As illustrated in FIG. 1E, when a second incoming call is received, the OGM 4 is played, and then the tape is automatically fast-forwarded to the position corresponding to the stored number of rotations $N_4$. At that time the tape is advanced at the forward, or normal speed.

Here, the apparatus has an erase head disposed forward of its record and playback head by a distance corresponding to approximately one second of normal playing time.

The tape 1 is erased for a period $T_2$ of about one second from the position corresponding to the number of rotations $N_4$ to a position d, and for that one-second period $T_2$ an alarm or "beep" tone is picked up from the tape 1. Then, the second ICM $6_2$ is recorded from the position d. At the termination of the ICM $6_2$, the number of rotations $N_5$ corresponding to the position at the end thereof is stored, an alarm portion $5_2$ with the duration $T_1$ is created. Thereafter, the tape 1 is rewound to the beginning of the OGM 4 (i.e., to the position corresponding to $N_1$ rotations). At that time, the TAM again stands by for any further incoming calls.

As shown in FIG. 1F, whenever a third or subsequent incoming call is received, the OGM 4 is first played, and the tape is then advanced at fast-forward speed to skip beyond all of the previously recorded incoming messages $6_1$ to $6_{n-1}$. Then, the tape is erased for about one second to form the alarm portion $5_{n-1}$ with the period $T_2$. After this, the incoming message $6_n$ is recorded, followed by a subsequent alarm portion $5_n$ of length $T_1$.

As a result, when the OGM 4 and all of the incoming messages $6_1$ to $6_n$ are recorded on the tape 1, these messages are separated by alarm portions $5_1$ to $5_{n-1}$ of nearly equal length $T_2$, and the last recorded incoming message $6_n$ is follwed by an alarm portion $5_n$ of greater duration $T_1$. Also, the numbers of rotations $N_1$ to $N_{n+3}$, corresponding to the tape advancement at points from the beginning of the OGM 4 to the end of the last ICM $6_n$ are stored.

If the allotted time for recording each of the incoming messages $6_1$ to $6_n$ is thirty seconds, and approximately ten seconds of tape is erased following the recording operation, then approximately twenty incoming messages can be recorded on a single magnetic tape 1 of ten minutes recording time.

Figure 2:
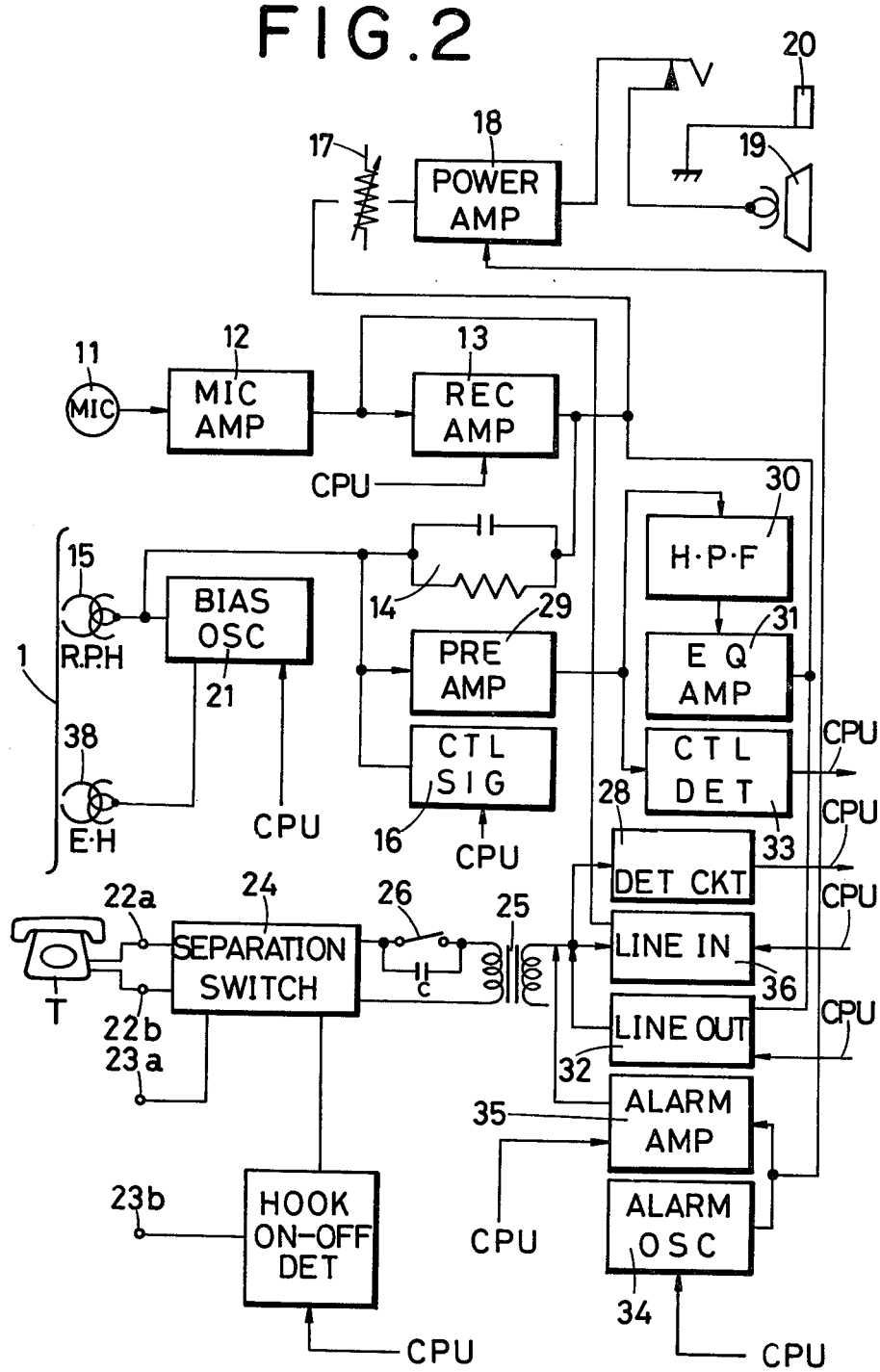
FIGS. 2 and 3 are circuit diagrams showing one embodiment of this invention.
Figure 3:
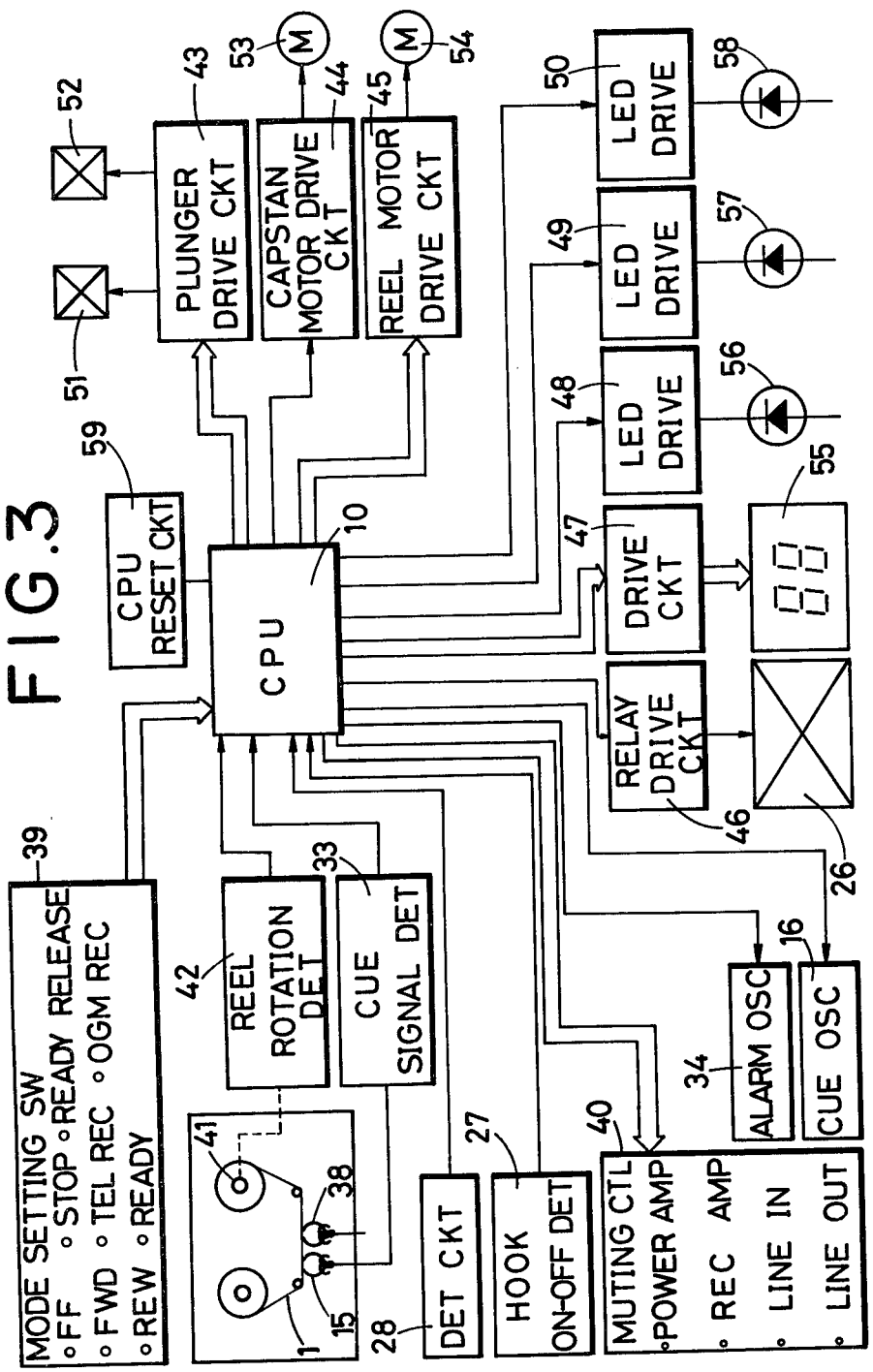

A telephone answering machine embodying this invention is illustrated in FIGS. 2 and 3. In this embodiment of the telephone answering machine, a microcomputer central processing unit (CPU) 10 is included. Preferably the CPU 10 includes a ROM or other storage unit which is pre-programmed with the necessary instructions for carrying out all of the above-described operations, and sufficient memory storage for storing the values $N_1, N_2 \ldots N_{n+3}$ corresponds to the length of advancement of the tape 1 at the locations mentioned above. The CPU 10 can also include an up-down counter to keep track of the number of rotations $N_n$, and a comparator to compare the counted number with the stored values $N_1, N_2 \ldots N_{n+3}$.

As shown in FIG. 2, the telephone answering machine of this embodiment also includes a built-in microphone 11 for use in preparing the recorded OGM 4. This microphone 11 is coupled through a microphone amplifier 12, a recording amplifier 13, and an equalizer 14 to a recording and playback head (RPH) 15. A cue signal oscillator 16 controlled by the CPU 10 provides to the head 15 a control signal, which in this embodiment is a 30 Hz tone. The recording amplifier 13 is also coupled through a volume-control variable resistor 17 to an input of a power amplifier 18, which is coupled to a loudspeaker 19 and an earphone jack 20. The earphone jack 20 is coupled to cut out the loudspeaker 19 when an earphone plug is inserted therein, so that the telephone subscriber can audit any recorded calls in relative privacy.

A bias oscillator 21, controlled by the CPU 10, provides a bias current to the recording and playback head 15, and also provides an erasing current to an erase head 38.

Telephone instrument terminals 22a, 22b are provided to couple the TAM to a telephone instrument T, and telephone line terminals 23a, 23b are provided to couple the TAM to the tip side and ring side of the incoming telephone line.

The telephone line, the instrument T, and the TAM are coupled together by a separation switch 24. This switch 24 has a TEL-SIDE condition in which the telephone instrument T is operative but the TAM is inoperative, and a TAM-SIDE condition in which the telephone instrument and the telephone answering machine are connected in parallel, and both are operative. The separation switch is coupled through a capacitor C to permit ringing current to pass to a line transformer 25. A line answering relay 26 is included between the switch 24 and the line transformer 25 to connect the TAM to the telephone line in response to a detection of ringing current.

An on-hook/off-hook detector 27 is connected to the telephone line and detects whether the telephone instrument T is cradled or uncradled. The detector 27 provides an on-hook signal to the CPU 10 so long as the instrument T is cradled.

A ringing detector 28 coupled to the line transformer 25 senses ringing current, and signals to the CPU 10 when an incoming call is present.

A preamplifier 29 has an input coupled to the recording and playback head 15 and has an output coupled through a high-pass filter 30 and an equalizing amplifier 31 to a line output device 32. The latter device 32, controlled by the CPU 10, connects the amplifier 31 with the line transformer 25 and thence with the telephone line. Thus, the CPU enables the recorded OGM 4 to be played to the calling party. The high-pass filter 30 has a cutoff frequency of, for example, 100 Hz, so that the control signal is blocked from the equalizing amplifier 31. The preamplifier 29 is also coupled in advance of the filter 30 to a control signal detector 33. The control signal detector 33 provides to the CPU 10 a "1" when the control signal in being picked up by the transducer head 15, but a "0" otherwise.

During the playing of the OGM 4, the control signal is blocked by the high-pass filter 30, but is furnished to the control signal detector 33. Thus, during the OGM 4, the detector 33 provides a "1" to the CPU 10, but during the silent portions $3_1$ and $3_2$ the detector 33 provides a "0" to the CPU 10.

The telephone answering machine also includes an alarm oscillator 34 controlled by the CPU 10 to provide an audible alarm tone at the end of the OGM 4, for example, by providing a "beep" tone after a thirty second interval has elapsed. This alarm tone is provided both to the power amplifier 18 and also to an alarm amplifier 35 controlled by the CPU 10, and from the amplifier 35 to the line transformer 25.

A line input circuit 36 is controlled by the CPU 10 to receive incoming messages from the calling parties and to furnish such messages to the input of the recording amplifier 13. The input of the input circuit is coupled to the alarm amplifier 35. In the intervals following the silent portion $3_2$ and the alarm portions $5_1$ to $5_{n-1}$ the telephone line is coupled through the line input circuit 36 to the recording amplifier 13 and the equalizer 14, and thence to the recording and playback head 15 to record the calling party's incoming message $6_1$ to $6_n$. Thereafter the alarm tone is provided through the line input circuit to the recording amplifier 13 to create the alarm portions $5_1$ to $5_n$.

FIG. 3 shows a general arrangement of the CPU 10 and the other elements of the telephone answering machine.

A mode setting switch array 39 is coupled to the CPU 10 so that the subscriber can enter appropriate instructions for controlling the CPU 10. The mode setting switches contained in the array 39 are preferably non-locking push-button switches, here marked to indicate the selection of fast-forward, forward, rewind, stop, TEL-REC, ready, ready release, and OGM-record modes. These switches are closed momentarily to apply a triggering signal to a self-holding operation controlling circuit (not shown) in the CPU 10.

A muting control signal 40 is selectively povided from the CPU 10 signal is provided from the CPU 10 to the power amplifier 18, to the preamplifier 29, to the line input circuit 36, and to the line output circuit 32.

When the OGM 4 is being recorded in the operation described below, a muting control signal is applied to the power amplifier 18 to prevent resonance from being established between the speaker 19 and the built-in microphone 11.

When the tape 1 is being erased to provide the silent portions $3_1$ and $3_2$ when the alarm portions $5_1$ to $5_n$ are being recorded, muting control signal is provided to the recording preamplifier 29.

Except during periods when an ICM $6_1$ to $6_n$ or the ensuing alarm portion $5_1$ to $5_n$ is being recorded, a muting control signal is provided to the line input circuit 36. This prevents a ringing signal from being recorded together with the OGM 4, if an outside party should happen to call while the OGM 4 is being prepared.

Except during periods when the OGM 4 is being played, a muting control signal is furnished to the line output circuit 32. This feature prevents noise, such as motor noise or mechanical noises due to changing of speeds of the drive mechanism, from being placed on the phone line to a calling party.

A reel shaft 41 of the tape drive mechanism is connected to a reel-rotation detector 42. This detector 42 senses the rotating of the reel shaft 41, and the number of such rotations is counted to provide the numbers $N_1$, $N_2$, $N_3$ ... $N_{n+3}$ corresponding to the beginning and end of the OGM 4 and to the end of each ICM $6_1$ to $6_n$. The cessation of movement of the shaft 41 is also detected in the detector 42 to indicate that the tape has been rewound to the head position a.

The CPU 10 applies control signals to a plunger drive circuit 43, to a capstan motor drive circuit 44, and to a reel motor drive circuit 45. The CPU 10 also provides control signals to a relay drive circuit 46 for causing the relay 26 to close and to a display drive circuit 47 and to LED drive circuits 48, 49, and 50.

The plunger drive circuit 43, in turn, controls a forward running plunger 51 and a fast-forward/rewind plunger 52. The plunger 51 is actuated when a forward mode (i.e., the record mode or the playback mode) is selected to displace a head plate (not shown) to its active position in which the heads 15 and 38 thereon engage the tape 1, and a capstan and an associated press roller also engage the tape 1. The plunger 52 is actuated whenever the rewind or the fast-forward mode is selected and displaces a brake plate (not shown) to condition a brake mechanism (not shown) associated with the tape reel shaft 41 for braking the motion of the tape 1 under high speed (fast-forward and rewind) operations. This head plate and brake plate with their associated mechanisms are conventional. and drawings and description thereof are omitted to simplify the present disclosure.

The motor drive circuits 44 and 45 furnish drive currents to a capstan motor 53 and to a reel drive motor 54, respectively.

The drive circuit 47 drives a digital display 55 to indicate the number of incoming messages which have been recorded on the tape 1.

The LED drive circuits 48-50 respectively drive an operation-display LED 56, a stand-by display LED 57, and an OGM stand-by display LED 58.

A CPU reset circuit 59 automatically resets the CPU 10 when power is first applied to the device, or upon ejection of the tape cassette from the device.

The operation of the TAM can be explained first by discussing the preparation of the recorded OGM 4.

The outgoing message 4 is set up on the tape 1 according to the following method, as illustrated in FIGS. 1B and 1C. First, when tape 1 has been mounted on the TAM, the subscriber actuates the OGM recording button, and the tape is automatically rewound to the position a and is stopped. After this, the tape 1 is advanced at fast-forward to a position, slightly in advance of the position b, corresponding to approximately fifty-five seconds at the normal or forward running speed. The tape 1 is then erased at the normal speed to the position corresponding to the number $N_1$, which is a few seconds beyond the end position b of the leader portion 2. Thereupon, the TAM stands by for recording of the OGM 4, and the OGM stand-by display LED 58 is lit.

Now, the subscriber again actuates the OGM recording button to place the TAM into a recording mode. The subscriber then speaks into the microphone 11 to record an appropriate message indicating that the subscriber is not available to speak to the calling party and that the calling party should leave his or her message to be recorded. The 30 Hz control signal is preferably recorded simultaneously with the OGM 4.

When the nominal time allotted for the OGM 4 elapses, the alarm oscillator 34 generates the "beep" tone, and the TAM is automatically shut off. Then, the silent portion $3_2$ is formed, and the tape 1 is stopped.

At this stage, the subscriber actuates a telephone-answering mode, or Ready button, and the tape 1 is automatically rewound to the position a. There the counted number of rotations of the shaft 41 is set to zero. The TAM is automatically set into the playback mode and as soon as the control signal is detected, the number $N_1$ is stored in a memory location in the CPU 10 to indicate the beginning of the OGM 1. Then, the OGM 4 is automatically played back so the end of the control signal corresponding to the end of the OGM 4, the TAM remains in the reproducing mode for about one second, and then is set into the erasing mode for one second. At that point, the tape is halted and the number $N_3$ of rotations of the shaft 41 is stored in another memory location in the CPU 10. Following this, the tape 1 is automatically rewound to the position corresponding to the number $N_1$, and the TAM stands by for any incoming calls. At this time, the incoming message stand-by display LED 57 is lit.

When an outside calling party dials up the subscriber, and the incoming telephone call arrives while the device is in its stand-by mode, a ringing signal, for example, a 15 Hz AC signal, is supplied to the telephone instrument T and is also applied through the line transformer 25 to the ringing detector 28. In this example, the ringing detector 28 is preset to supply a detecting signal after two rings, although any arbitrary number of rings could be selected. Then, in response to the detecting signal, the CPU 10 signals the relay drive circuit 46 which closes the relay 26 and thereby answers the incoming telephone call.

At that time, the OGM 4 is reproduced from the tape 1. The reproduced signal picked up from the head 15 is supplied through the preamplifier 29 and the OGM 4 is furnished through the high pass filter 30, the equalizing amplifier 31, and the line output circuit 32 to the phone line. The CPU 10 will then compare the stored value $N_3$ with the number of rotations of the shaft 41 to determine when the end of the OGM 4 is reached. Thereupon, the alarm oscillator 34 is caused to provide its "beep" tone for approximately two second through the alarm amplifier 35 and the transformer 25, so that the calling party will be alerted that he or she may prepare to speak.

After the "beep" tone ends, the calling party can state his or her message, and the incoming message $6_1$ will be recorded on the tape 1.

When a period of about thirty seconds has elapsed, the TAM is automatically shut off, the number $N_4$ of rotations is stored in the CPU 10, and the incoming call is terminated. Then, the alarm portion $5_1$ is formed and the tape 1 is rewound to the position corresponding to the number of shaft rotations $N_1$.

When a subsequent calling party dials up the subscriber, the initial part of the foregoing operation is repeated, and the OGM 4 is played. After the alarm tone is produced at the end of the OGM 4, the tape is fast-forwarded up to approximately the position corresponding to the number $N_4$ of rotations. It is preferred to brake the tape 1 slightly in advance of that position and then run the tape 1 at normal speed until the position of $N_4$ rotations is reached. Then, the tape 1 is erased for one second and the second incoming message $6_2$ is recorded. After the call is terminated, the number $N_5$ corresponding to the end of the incoming message $6_2$ is stored, the alarm portion $5_2$ is formed, and the tape 1 is rewound to the beginning of the OGM 4. Once again the TAM is conditioned to stand by to answer a subsequent calling party.

Similarly, for third and subsequent calls, the OGM 4 is played, following which the tape is advanced to a position corresponding to the number $N_{n+2}$ of shaft rotations at the end of the next previous recorded incoming message $6_{n-1}$. Then, the tape is erased for one second while the alarm tone in portion $5_n$ is reproduced, after which the incoming message $6_n$ is recorded. At the end thereof, the number $N_{n+3}$ of rotations is stored in the CPU 10, the alarm portion $5_{n+1}$ of length $T_1$ is created, and the tape 1 is rewound to the beginning of the OGM 4.

Thus, whenever an incoming call is received, the tape is fast forwarded beyond any previously recorded incoming messages. The positions at the beginning of the outgoing message 4 and at the ends of the incoming messages $6_1$ to $6_n$ are accurately detected by comparing a count of the number of rotations of the reel shaft 41 with the stored numbers $N_1$, $N_3$, ... $N_{n+3}$. Any misoperation due to noise on the tape can be avoided, thereby providing an advantage over alternative operations wherein a search control signal recorded on the tape must be relied upon to indicate the beginning of the OGM 4 and the ends of the ICMs $6_1$ to $6_n$.

It should be apparent that the tape 1 need not be a virgin tape, and can be previously recorded tape that need not be erased before use.

With a TAM of this invention, a subscriber can use any of several tapes each of which has a pre-recorded outgoing message. Thus, the user can select a previously-recorded tape to greet incoming callers in a particular fashion, and need not prepare the OGM 4 each time the subscriber's situation changes.

In order to enable various tapes each having a pre-recorded OGM 4 of arbitrary lengths, the TAM operates as follows. The number of shaft rotations $N_1$ and $N_2$ corresponding to the beginning and end of the OGM 4 and the number of rotations $N_3$ corresponding to the start point for the first incoming message $6_1$ will, of course, vary from tape to tape. However, these positions for any of the respective tapes can be determined by use of the control signal which is recorded along with the OGM 4. After loading the TAM and after the subscriber has pressed the Ready button, the tape is advanced as aforesaid and the control signal detector 33 provides a "1" to the CPU 10 at the beginning of the OGM 4 and a "0" at the end thereof. Thus, the CPU 10 can accurately store the number of rotations $N_1$ and $N_2$ corresponding to the beginning and end of the OGM 4. Thereafter, the position corresponding to the beginning of the first ICM $6_1$ is determined and the number $N_3$ representing it is stored in a memory location of the CPU 10.

The loading operation can be performed at high speed to shorten the loading time. In particular, when the tape is loaded, the tape drive can operate in its fast-forward mode with the recording and playback head 15 pressed softly against the tape 1. Here, the frequency of the detected control signal, which is recorded at 30 Hz, will reproduced at a higher frequency, for example, in the range of 300-800 Hz, and can be easily detected. The beginning and end of the OGM can be determined accordingly, and the numbers $N_1$ and $N_2$ can be properly stored in the CPU 10.

However, when the OGM 4 is reproduced, the control signal is blocked by the high pass filter 30, and is not heard by the calling party.

In the foregoing embodiment, the recording time for each incoming message is set at approximately thirty seconds. The result of this is that there is some waste of available time if the incoming message is relatively short. For example, if the incomimg message ends in twenty seconds, the TAM continues to record even though there may be no further information, and the remaining time, i.e., approximately ten seconds, will be silent. Thus, in this embodiment, out of the total recording time of six-hundred seconds (twenty thirty-second calls) a significant portion of the space allocated for incoming messages $6_1$ to $6_n$ can be wasted.

Figure 4:
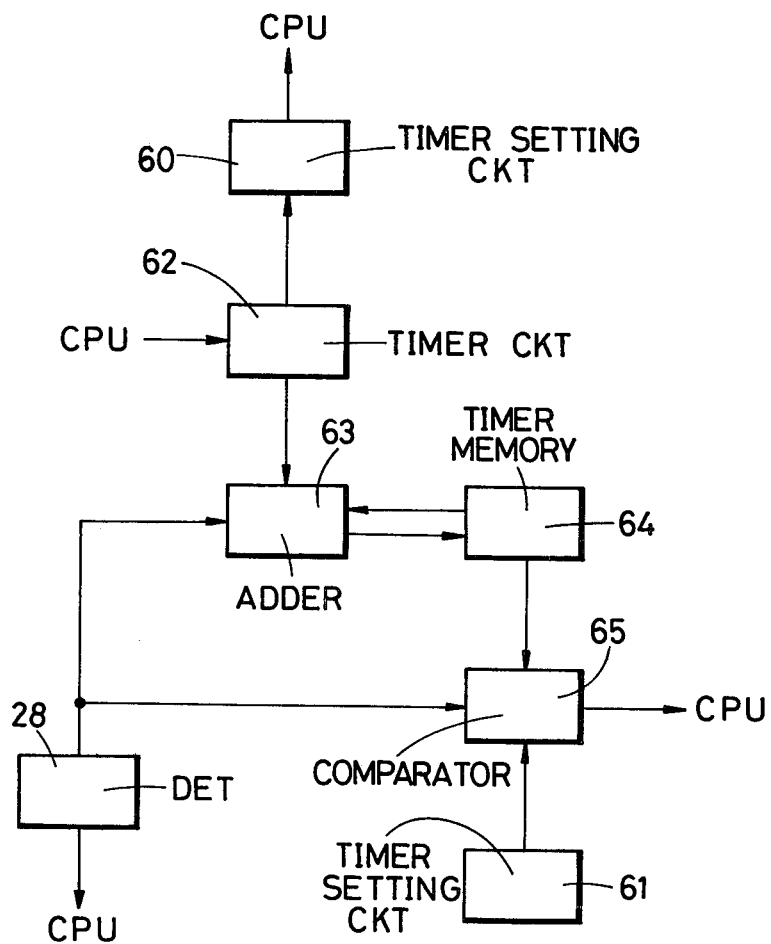
FIG. 4 is a circuit diagram illustrating a portion of a second embodiment of this invention.

In order to avoid this problem, a second embodiment of this invention is shown in FIG. 4 to include, in addition to the elements of FIGS. 2 and 3, means for releasing the telephone answering machine from the recording mode if the calling party hangs up prior to the lapse of thirty seconds. Thus, in this second embodiment, more than 20 incoming messages can be recorded, with an aggregate recording time of, for example, six-hundred seconds.

In this second embodiment, the detecting circuit 28 is arranged also to detect a call-inhibiting tone which is generated after the incoming calling party recradles his or her telephone instrument. Then, a signal indicating that this call-inhibiting tone is present is furnished from the ringing detector 28 to the CPU 10 to release the telephone answering machine from its recording mode, and to place it in the erasing mode and then to form the alarm portion $5_n$. In this embodiment, a timer setting circuit 60 sets the maximum recording time of thirty seconds for each incoming message $6_1$ to $6_n$. A second timer setting circuits 61 sets the maximum total recording time, for all the incoming messages $6_1$ to $6_n$, to six-hundred seconds. A timer circuit 62 detects the recording time for each incoming message $6_1$ to $6_n$. Whenever the recording time for the incoming message $6_1$ to $6_n$ equals thirty seconds, the timer setting circuit 60 supplies an instruction signal to the CPU 10 to cause the latter to terminate the incoming call. At that time, the telephone answering machine is automatically released from its recording mode.

If the incoming message terminates before the expiration of thirty seconds, the detector 28 detects the call-inhibiting tone and provides the CPU 10 with a signal to cause the latter to release the telephone answering machine from its recording mode. The recording time as detected by the timer circuit 62 is furnished to an adder circuit 63. The latter is coupled to the detector 28, and, as soon as the calling party hangs up, adds the recording time from the timer 62 to the accumulated total time as stored in a timer memory 64, and then stores the sum thereof as a new cumulative total time in the timer memory 64.

A comparator 65 has inputs coupled to the timer memory 64, to the detector 28, and to the timer setting circuit 61. The comparator 65 provides a coincidence signal to the CPU 10 to cause the latter to release the telephone answering machine from the recording mode whenever the cumulative total time following the end of an incoming message coincides with six-hundred seconds, or is within a predetermined amount of time sufficiently close to six-hundred seconds so that it would not be feasible to record another incoming call. In response to such coincidence signal, the telephone answering machine is released from its recording mode when the total elapsed time is equal to, or is nearly equal to six-hundred seconds.

The telephone answering machine of this invention is arranged so that a telephone-recording-only, or TEL-REC mode can be selected in which the outgoing message is not played to greet an incoming caller. In other words, in the TEL-REC mode, whenever an incoming call is received, the message from calling party is recorded without first playing the OGM 4. In order to establish the TEL-REC mode, the TEL-REC button is actuated, and the telephone answering machine stands by for the next incoming call.

In this device, in order to avoid the inadvertant erasure of the OGM 4 when the TEL-REC mode is selected, the tape 1 is automatically advanced at the fast-forward speed for a predetermined time. If this predetermined time is selected to correspond to sixty seconds of normal speed, than the OGM 4 will be bypassed, and the tape will be advanced to a position beyond the end of the OGM 4 to stand by to record the incoming call. However, it is also possible to cause the tape 1 to be advanced for any greater length of time. For example, if it desired to bypass not only the OGM 4 but also any previously-recorded incoming messages $6_1$ to $6_n$, the tape can be advanced for any distance up to that corresponding to six-hundred seconds of normal speed play when the TEL-REC button is pushed. To this end, the number of rotations of the shaft 41 can be counted, and the tape advanced until such number equals the number $N_{n+3}$ stored in the CPU 10 to correspond to the end of the last-recorded incoming message $6_n$.

Figure 5:
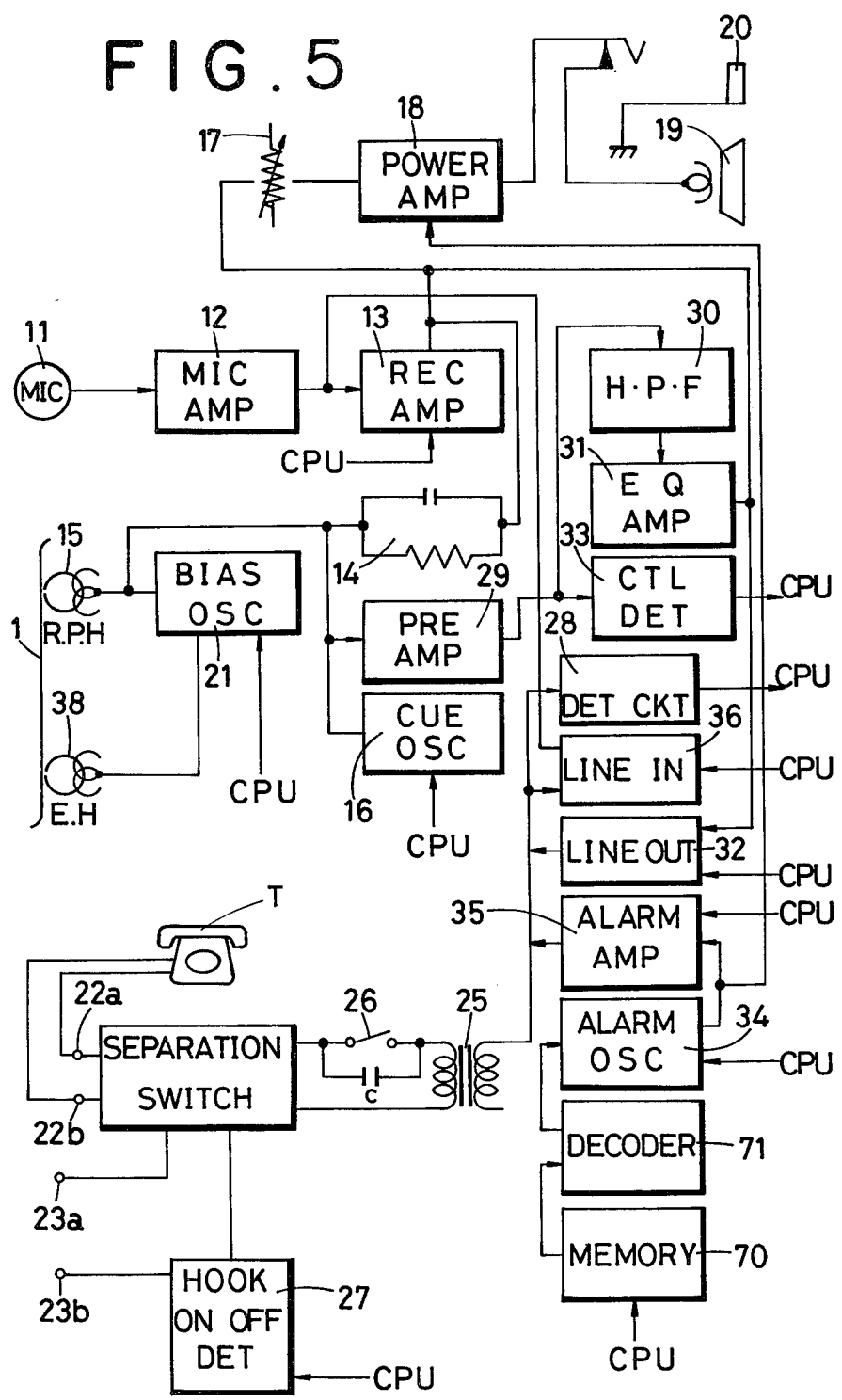
FIG. 5 is a circuit diagram showing a third embodiment of this invention.

A third embodiment of this invention is illustrated in FIG. 5, in which elements corresponding to those illustrated in FIG. 2 are identified with the same reference characters, and for which a detailed description thereof is omitted.

In this embodiment, the subscriber, upon playing back the recorded tape 1 containing incoming messages $6_1$ to $6_n$, can determine the sequence number for each individual incoming message while the same is begin played back.

In a conventional TAM, when the subscriber plays back the tape 1 from the beginning of the first recorded incoming message $6_1$, the user must count the messages himself or herself to determine the order or sequence number of each individual message $6_1$ to $6_n$. Thus, if the subscriber begins playing the tape from an intermediate point he or she has no means for determining what the sequence number is for the particular incoming message being played back.

In order to provide the subscriber with an audible code to identify the sequence number of each incoming message $6_1$ to $6_n$, the third embodiment includes a memory circuit 70 having an input coupled to the CPU 10, and an output coupled to a decoder 71, which in turn is connected to an input of the alarm oscillator 34. The memory circuit 70 stores the sequence number of the incoming message $6_1$ to $6_n$ while it is being recorded, and the decoder 71 provides a code sequence, based upon the contents of the memory 70, to the alarm oscillator 34. During the recording of an incoming message, the decoder 71 causes the alarm oscillator 34 to provide a coded audible signal, like those shown in FIG. 6, to identify the sequence number of the individual incoming messages $6_1$ to $6_n$. These codes are then recorded at intervals of, for example, three to five seconds, together with the incoming message.

Figure 6:
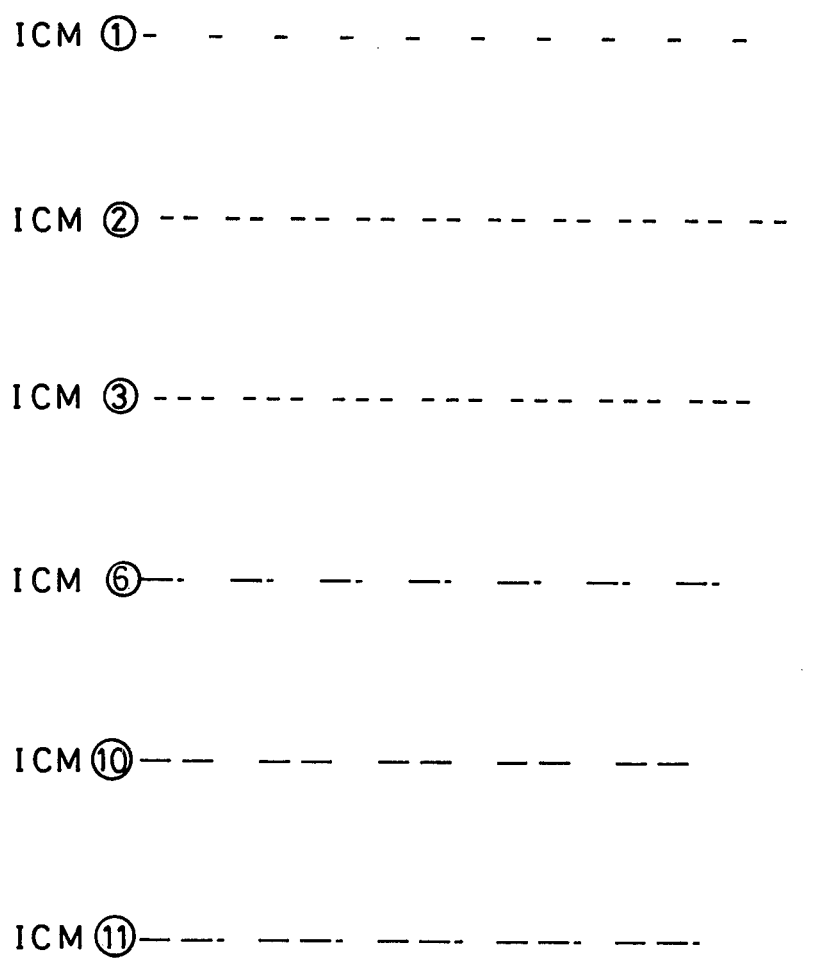

When the tape 1 so recorded is played back, the reproduced incoming messages $6_1$ to $6_n$ and the respective identifying codes as shown in FIG. 6 are picked up by the recording and playback head 15. Then, both these signals are supplied through the reproducing amplifier 29, the filter 30, the equalizer 31, and the power amplifier 18 to the speaker 19. The reproduced codes do not interfere with the subscriber's listening to the reproduced ICMs $6_1$ to $6_n$.

This third embodiment is particularly useful if combined with the arrangement of the second embodiment, in which more than a fixed number of incoming messages can be recorded within the maximum aggregate recording time.

As shown in FIG. 6, one possible code configuration for codes provided from the decoder 71 can use one short signal burst in each group to identify the first incoming message $6_1$, two short bursts to identify the second incoming message $6_2$, and three short bursts to identify the third $6_3$. A long burst can be used in place of five short bursts, so that, for example, the incoming messages $6_6$, $6_{10}$, and $6_{11}$ are identified by a single long burst followed by a single short burst, two long bursts, and two long bursts followed by a short burst, respectively. This code is particularly simple for the subscriber to hear and to interpret.

Figure 7:
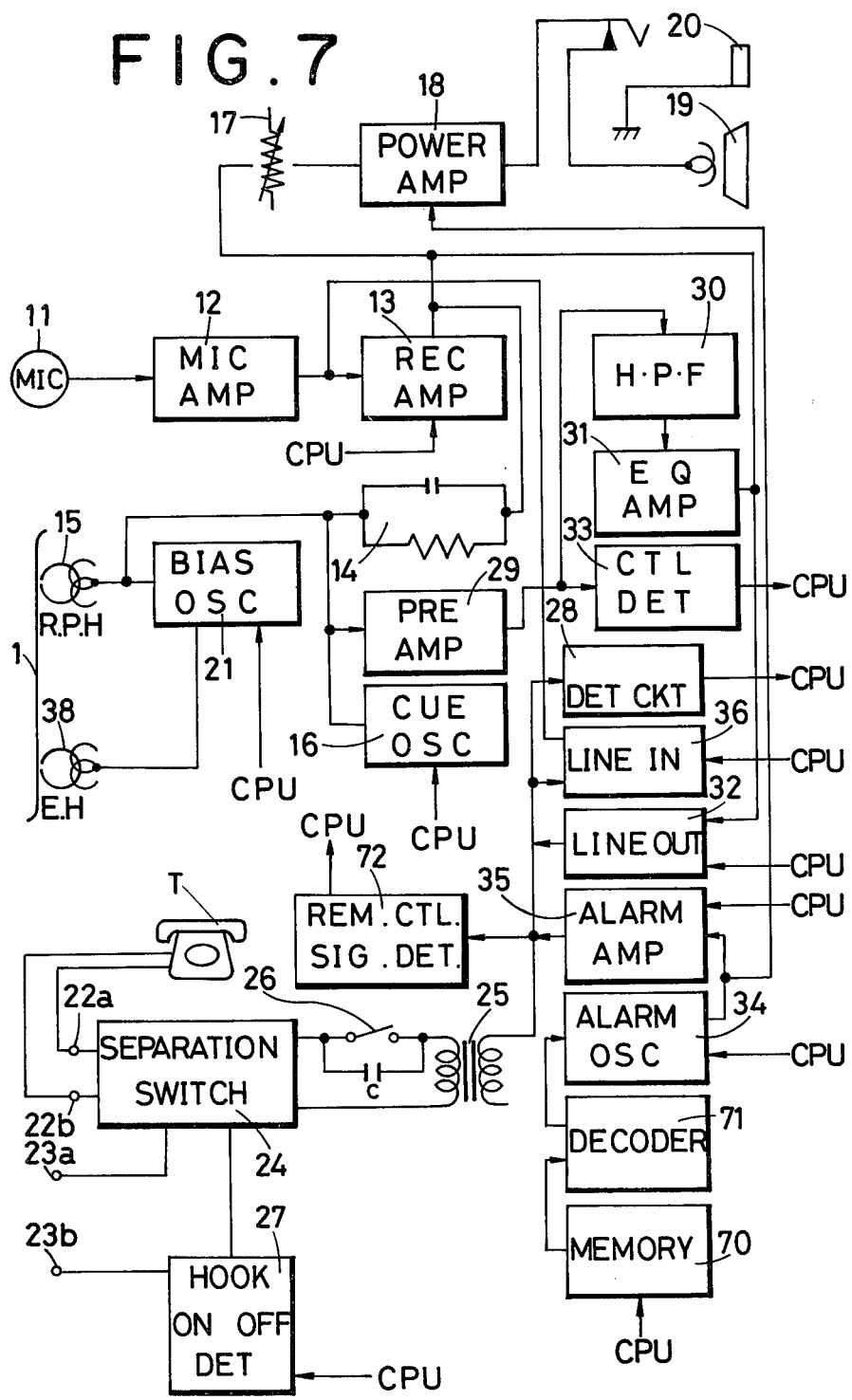
FIG. 7 is a circuit diagram showing a fourth embodiment of this invention.

A fourth embodiment of this invention is shown in FIG. 7, in which elements in common with the embodiment of FIG. 5 are identified with the same reference numerals and for which a detailed description thereof is omitted. This embodiment is highly suited for operation by remote control.

It is well known that telephone answering machines can be constructed so that the subscriber, by calling his or her own number while away, and by producing a special tone from a tone generator, can cause his or her telephone answering machine to advance the tape at high speed, or to rewind the tape for searching and playing of a desired one of the recording incoming messages. However, in a conventional telephone answering machine, there is no means provided to inform the subscriber calling from a remote location the number of total incoming calls $6_1$ to $6_n$ that have been recorded. To avoid this shortcoming, the embodiment of FIG. 7 includes a remote control signal detector 72 coupled to the line transformer 24, and as well includes the memory circuit 70 and the decoder 71.

The operation of these features of the embodiment of FIG. 7 is as follows. Whenever the remote control signal detector 72 detects the aforementioned special tone, it provides a remote-control command to the CPU 10. Thereupon, the CPU 10 provides to the memory circuit 70 the number of total recorded incoming messages $6_1$ to $6_n$. As a result, the decoder 71 provides an appropriate code as illustrated in FIG. 6, to the alarm oscillator 34 so that the subscriber is provided with the code corresponding to the sequence number of the last-recorded incoming message.

As an alternative, the sequence number of the last recorded incoming message $6_n$ can be recorded on the tape in advance of the first incoming message $6_1$, or at any other convenient location along the tape 1.

Although illustrated embodiments of the present invention have been described in detail herein with reference to the accompanying drawings, it is to be understood that this invention is not limited to those precise embodiments, and that various changes and modifications can be effected therein by one skilled in the art without departing from the scope and spirit of the invention as defined in the appended claims.

We claim:

1. A method of automatically answering phone calls on a phone line and recording messages from calling parties in sequence on a single magnetic tape with a magnetic tape device having a stop mode, a rewind mode, a forward mode, and a fast-forward mode comprising the steps of:

providing a magnetic tape having recorded thereon an outgoing message and a control signal indicating the end of said outgoing message;

automatically coupling the device to the phone line upon detection of a ringing signal on the phone line;

setting the device into its forward mode and playing said prerecorded outgoing message;

detecting the length of advance of said magnetic tape, with values representing the length of advance at the beginning and end of the outgoing message and at the end of any previously recorded incoming message being stored, wherein said stored value representing the length of advance at the end of said outgoing message is determined by using said control signal;

comparing the length of advance of said magnetic tape with said stored values and when said length corresponding to the end of the outgoing message is reached and if no previous incoming messages have been recorded, recording in said track any incoming message from the calling party, but if there have been previously recorded any such incoming messages, setting said device into its fast-forward mode until the length of advance corresponding to the end of the last such previously-recorded incoming message is detected, and then setting said device into its forward mode and recording the incoming message from the calling party;

upon termination of the incoming message, storing the value representing the length of advance at the end thereof, and setting the device into its rewind mode;

detecting said length of advance as said tape is rewound, and comparing said detected length of advance with said stored values; and when said detected length of advance corresponds to the stored value representing the beginning of said outgoing message, setting said device into its stop mode, thereby conditioning the device to greet any subsequent calling parties by playing back said recorded outgoing message.

2. A method of automatically answering phone calls on a phone line and recording messages from calling parties in sequence on a single magnetic tape with a magnetic tape device having a stop mode, a rewind mode, a forward mode, and a fast-forward mode comprising the steps of:

automatically coupling the device to the phone line upon detection of a ringing signal on the phone line;

setting the device into its forward mode and playing a prerecorded outgoing message recorded in a track on the magnetic tape;

detecting the length of advance of said magnetic tape, with values representing the length of advance at the beginning and end of the outgoing message and at the end of any previously recorded incoming messages being stored;

comparing the length of advance of said magnetic tape with said stored values and when said length corresponding to the end of the outgoing message is reached and if no previous incoming messages have been recorded, recording in said track any incoming message from the calling party, but if there have been previously recorded any such incoming messages, setting said device into its forward mode and recording the incoming message from the calling party, wherein each said incoming message is recorded with an audible code signal heard when said tape is played back to identify the number in sequence of the incoming message, upon termination of the incoming message, storing the value representing the length of advance at the end thereof, and setting the device into its rewind mode;

detecting said length of advance as said tape is rewound, and comparing said detected length of advance with said stored values; and when said detected length of advance corresponds to the stored value representing the beginning of said outgoing message, setting said device into its stop mode, thereby conditioning the device to greet any subsequent calling parties by playing back said recorded outgoing message.

3. A method of automatically answering phone calls according to claim 1, further comprising, after automatically coupling said device, the steps of detecting a predetermined remote-control signal from the incoming caller indicative of a request to play back any recorded incoming messages; and providing to said phone line in response to such remote-control signal an audible code signal indicative of the total number of such recorded messages.

4. An automatic telephone answering device in which an outgoing message recorded in a track in a magnetic medium is played back to greet calling parties, incoming messages from such calling parties are recorded in sequence in the same track on said medium and a control signal is recorded on said medium to indicate the end of said outgoing message, comprising:

means for detecting an incoming call and automatically connecting the device to a phone transmission line when an incoming call is detected;

transducer means for recording signals on said medium and picking up the recorded signals therefrom;

drive means for advancing said magnetic medium relative to said transducer means and capable of being set into a forward mode, a fast-forward mode, a rewind mode, and a stop mode;

measuring means for determining the length of advancement of said magnetic medium;

control signal detecting means for detecting said control signal to determine the length of advancement of said magnetic medium at the end of the outgoing message; and control circuit means coupled to said measuring means for storing determined values representing the length of advancement of said medium at the beginning and end of the outgoing message and at the end of any incoming message, and for comparing the determined length of advancement of said medium with said stored values, and coupled to said drive means so that when said device is first connected to said phone transmission line, said drive means is set into its forward mode to play back said outgoing message, when said control circuit means determines that the length of advancement corresponds to the stored value representing the end of the outgoing message, then, if there have been no previously-recorded incoming messages, said device records any incoming message from the calling party, but if there have been previously recorded any such incoming messages, said drive means is set into its fast-forward mode until the length of advancement corresponds to the value representing the end of the last of the previously-recorded incoming messages, following which said drive means is set into its forward mode for recording the incoming message from the calling party, after termination of the incoming call, the value representing the length of advancement at the end of such incoming call is stored, and said drive means is set into its rewind mode for rewinding said medium back to the beginning of said recorded outgoing message, and when said control means determines that the length of advancement of the medium being rewound corresponds to the stored value representing the beginning of the recorded outgoing message, said drive means is set into its stop mode, thereby conditioning the device to greet any subsequent calling parties by playing back said recorded outgoing message.

5. An automatic telephone answering device according to claim 4, further comprising control signal generating means responsive to said control circuit means and coupled to said transducer means for supplying to the latter said control signal.

6. An automatic telephone answering device according to claim 4, wherein said drive means includes at least one rotary member operative to rotate in one direction to advance said medium forwardly and to rotate in an opposite direction when said medium is rewound; and said measuring means includes sensing means for sensing the rotation of said rotary member and counting means for counting the sensed rotations.

7. An automatic telephone answering device according to claim 4, further comprising timing means operative to measure incoming-message elapsed time beginning from the time that said transducer means commences recording each such incoming message on said magnetic medium, storing means for storing a quantity representing total elapsed time for all incoming messages recorded on said medium; adding means for adding the contents of said measuring means to the contents of said storing means and storing the resulting sum in said storing means; comparing means for comparing the contents of said storing means with a predetermined quantity and sending a coincidence signal to said control circuit means whenever the contents of said storing means bear a preestablished relation to said predetermined quantity for releasing said answering device from its recording mode when said total elapsed time approaches the time available on said medium for recording incoming messages.

8. An automatic telephone answering device in which an outgoing message recorded in track in a magnetic medium is played back to greet calling parties and incoming messages from such calling parties are recorded in sequence in the same track on said medium, comprising:

means for detecting an incoming call and automatically connecting the device to a phone transmission line when an incoming call is detected;

transducer means for recording signals on said medium picking up the recorded signals therefrom;

drive means for advancing said magnetic medium relative to said transducer means and capable of being set into a forward mode, a fast-forward mode, a rewind mode, and a stop mode;

measuring means for determining the length of advancement of said magnetic medium;

control circuit means coupled to said measuring means for storing determined values representing the length of advancement of said medium at the beginning and end of the outgoing message and at the end of any incoming message, and for comparing the determined length of advancement of said medium with said stored values, and coupled to said drive means so that when said device is first connected to said phone transmission line, said drive means is set into its forward mode to play back said outgoing message, when said control circuit means determines that the length of advancement corresponds to the stored value representing the end of the outgoing message, then, if there have been no previously-recorded incoming messages, said device records any incoming message from the calling party, but if there have been previously recorded any such incoming messages, said drive means is set into its fast-forward mode until the length of advancement corresponds to the value representing the end of the last of the previously-recorded incoming messages, following which said drive means is set into its forward mode for recording the incoming message from the calling party, after termination of the incoming call, the value representing the length of advancement at the end of such incoming call is stored, and said drive means is set into its rewind mode for rewinding said medium back to the beginning of said recorded outgoing message, and when said control circuit means determines that the length of advancement of the medium being rewound corresponds to the stored value representing the beginning of the recorded outgoing message, said drive means is set into its stop mode, thereby conditioning the device to greet any subsequent calling parties by playing back said recorded outgoing message; and alarm signal means coupled with said control means and said transducer means for providing an alarm signal thereto for recording on said magnetic medium to be heard when said medium is played back, wherein said control circuit means is operative to cause said alarm signal means to furnish said alarm signal for a predetermined time after the end of each incoming message and to cause at least a portion of said alarm signal to be played back as a go-ahead signal before recording the next incoming message.

9. An automatic telephone answering device in which an outgoing message recorded in a track in a magnetic medium is played back to greet calling parties and incoming messages from such calling parties are recorded in sequence in the same track on said medium, comprising:

means for detecting an incoming call and automatically connecting the device to a phone transmission line when an incoming call is detected;

transducer means for recording signals on said medium and picking up the recorded signals therefrom;

drive means for advancing said magnetic medium relative to said transducer means and capable of being set into a forward mode, a fast-forward mode, a rewind mode, and a stop mode;

measuring means for determining the length of advancement of said magnetic medium;

control circuit means coupled to said measuring means for storing determined values representing the length of advancement of said medium at the beginning and end of the outgoing message and at the end of any incoming message, and for comparing the determined length of advancement of said medium with said stored values, and coupled to said drive means so that when said device is first connected to said phone transmission line, said drive means is set into its forward mode to play back said outgoing message, when said control circuit means determines that the length of advancement corresponds to the stored value representing the end of the outgoing message, then, if there have been no previously-recorded incoming messages, said device records any incoming message from the calling party, but if there have been previously recorded any such incoming messages, said drive means is set into its fast-forward mode until the length of advancement corresponds to the value representing the end of the last of the previously-recorded incoming messages, following which said means is set into its forward mode for recording the incoming message from the calling party, after termination of the incoming call, the value representing the length of advancement at the end of such incoming call is stored, and said drive means is set into its rewind mode for rewinding said medium back to the beginning of said recorded outgoing message, and when said control circuit means determines that the outgoing message, and when said control circuit means determines that the length of advancement of the medium being rewound corresponds to the stored value representing the beginning of the recorded outgoing message, said drive means is set into its stop mode, thereby conditioning the device to greet any subsequent calling parties by playing back said recorded outgoing message; and alarm signal means coupled with said control circuit means and said transducer means for providing an alarm signal thereto for recording on said medium, wherein said transducer means includes erasing means coupled to said control circuit means for creating silent regions along said track which are free of recorded signals, and said control circuit means is operated to cause said alarm signal means to furnish said alarm signal for a predetermined time after the end of each incoming message and to cause said transducer means to erase a portion of the alarm signal recorded on the track in advance of the beginning of the incoming message to be recorded, thereby reducing the duration of the recorded alarm signal.

10. An automatic telephone answering device in which an outgoing message recorded in a track in a magnetic medium is played back to greet calling parties and incoming messages from such calling parties are recorded in sequence in the same track on said medium, comprising:

means for detecting an incoming call and automatically connecting the device to a phone transmission line when an incoming call is detected;

transducer means for recording signals on said medium and picking up the recorded signals therefrom;

drive means for advancing said magnetic medium relative to said transducer means and capable of being set into a forward mode, a fast-forward mode, a rewind mode, and a stop mode;

measuring means for determining the length of advancement of said magnetic medium;

control circuit means coupled to said measuring means for storing determined values representing the length of advancement of said medium at the beginning and end of the outgoing message and at the end of any incoming message, and for comparing the determined length of advancement of said medium with said stored values, and coupled to said drive means so that when said device is first connected to said phone transmission line, said drive means is set into its forward mode to play back said outgoing message, when said control circuit means determines that the length of advancement corresponds to the stored value representing the end of the outgoing message, then, if there have been no previously-recorded incoming messages, said device records any incoming message from the calling party, but if there have been previously recorded any such incoming messages, said drive means is set into its fast-forward mode until the length of advancement corresponds to the value representing the end of the last of the previously-recorded incoming messages, following which said drive means is set into its forward mode for recording the incoming message from the calling party, after termination of the incoming call, the value representing the length of advancement at the end of such incoming call is stored, and said drive means is set into its rewind mode for rewinding said medium back to the beginning of said recorded outgoing message, and when said control circuit means determines that the length of advancement of the medium being rewound corresponds to the stored value representing the beginning of the recorded outgoing message, said drive means is set into its stop mode, thereby conditioning the device to greet any subsequent calling parties by playing back said recorded outgoing message; and coding means coupled to said control circuit means and to said transducer means for providing to the transducer means for each incoming message an encoded audible signal heard when said magnetic medium is played back to identify the sequence number of the incoming message being recorded.

11. An automatic telephone answering device according to claim 10, wherein said coding means includes memory means coupled to said control circuit means for storing a quantity corresponding to the sequence number of the incoming message being recorded, decoder means coupled to said memory means for providing a coded output signal in response to the quantity stored in said memory means, and audio signal generating means providing the encoded audible signal in response to said coded output signal.

12. An automatic telephone answering device according to claim 11, further comprising remote control signal detector means for detecting a predetermined remote control signal transmitted by the calling party and providing a remote control indication to said control circuit means so that the latter can perform a remote control operation; wherein said audio signal generating means is coupled to said phone line when said remote control signal is transmitted, and said control circuit means furnishes to said memory means the quantity representing the sequence number of the last-recorded incoming message, so that said audio signal generating means provides to the calling party the encoded audible signal representing the sequence number of said last-recorded incoming message in response to said remote control indication.

13. An automatic telephone answering device in which an outgoing message recorded in a track in a magnetic medium is played back to greet calling parties and incoming message from such calling parties are recorded in sequence in the same track on said medium, comprising:

means for detecting an incoming call and automatically connecting the device to a phone transmission line when an incoming call is detected;

transducer means for recording signals on said medium and picking up the recorded signals therefrom;

drive means for advancing said magnetic medium relative to said transducer means and capable of being set into a forward mode, a fast-forward mode, a rewind mode, and a stop mode;

measuring means for determining the length of advancement of said magnetic medium;

control circuit means coupled to said measuring means for storing determined values representing the length of advancement of said medium at the beginning and end of the outgoing message and at the end of any incoming message, and for comparing the determined length of advancement of said medium with said stored values, and coupled to said drive means so that when said device is first connected to said phone transmission line, said drive means is set into its forward mode to play back said outgoing message, when said control circuit means determines that the length of advancement corresponds to the stored values representing the end of the outgoing message, then, if there have been no previously-recorded incoming messages, said device records any incoming message from the calling party, but if there have been previously recorded any such incoming message, said drive means is set into its fast-forward mode until the length of advancement corresponds to the value representing the end of the last of the previously-recorded incoming messages, following which said drive means is set into its forward mode for recording the incoming message from the calling party, after termination of the incoming call, the value representing the length of advancement at the end of such incoming call is stored, and said drive means is set into its rewind mode for rewinding said medium back to the beginning of said recorded outgoing message, and when said control circuit means determines that the length of advancement of the medium being rewound corresponds to the stored value representing the beginning of the recorded outgoing message, said drive means is set into its stop mode, thereby conditioning the device to greet any subsequent calling parties by playing back said recorded outgoing message; and means for selecting a telephone-recording mode wherein said outgoing message is not played when said device is connected to the phone transmission line upon an incoming call, said control circuit means being responsive to said means for selecting to cause said drive means to advance said medium beyond said outgoing message, and conditioning the device to stand by to record any incoming calls without first playing the outgoing message.

14. An automatic telephone answering device according to claim 13, wherein said control circuit means is responsive to said means for selecting to cause said drive means to advance said medium beyond all incoming messages recorded on said medium.

15. In an automatic telephone answering device in which calling parties are greeted by playing of an outgoing message recorded on a track of a magnetic tape and any incoming messages from such calling parties are recorded in sequence on said track of the tape, and in which a control signal is recorded on said tape simultaneously with said outgoing message and beginning and ending at the beginning and end of said outgoing message; magnetic tape recording and reproducing apparatus comprising:

magnetic head means for reproducing said outgoing message and said control signal, and for recording said incoming messages on said track of the tape;

drive means for driving said magnetic tape having a forward mode, a fast-forward, a rewind mode, and a stop mode, and having at least one rotary member for driving the tape;

control circuit means coupled to said drive means for selecting one of said forward, fast-forward, rewind, and stop modes; and being selectably operative in at least an "Outgoing Message Record" mode and a "Ready" mode;

pulse generator means for providing pulses upon rotation of said rotary member;

counter means for counting said pulses;

control signal detecting means for detecting the presence and absence of said control signal; and memory means coupled to the control circuit means and to the counter means for storing the contents of said counter means upon command from said control circuit means; wherein when said "Ready" mode is selected, said rewind mode of said drive means is first established and said tape is rewound to the front end thereof, whereupon said counter means is reset; said fast-forward mode is established and the tape is advanced for a predetermined time until said control signal is detected; the control circuit means causes said memory means to store the contents of said counter means as a first count and said forward mode is established so that the tape is advanced at normal speed so long as said control signal is detected, whereby said magnetic head means reproduces said outgoing message; upon termination of the reproduced control signal, said control circuit means causes said memory means to store the contents of said counter means as a second count, and said rewind mode is established so that said tape is rewound until the contents of said counter means equals said first count; and said stop mode is selected so that said telephone answering device is conditioned to stand by to greet incoming calling parties with said recorded outgoing meassage.

16. In an automatic telephone answering deivce in which calling parties are greeted by playing of an outgoing message recorded on a track of a magnetic tape and any incoming messages from such calling parties are recorded in sequence on said track of the tape, and in which a control signal is recorded on said tape simultaneously with said outgoing message; magnetic tape recording apparatus comprising:
   magnetic head means for reproducing said outgoing message and said control signal, and for recording said incoming messages on said track of the tape;
   drive means for driving said magnetic tape having a forward mode, a fast-forward mode, a rewind mode, and a stop mode, and having at least one rotary member for driving the tape;
   control circuit means coupled to said drive means for selecting one of said forward, fast-forward, rewind, and stop modes; and being selectably operative in at least an "Outgoing Message Record" mode and a "Ready" mode, wherein said outgoing message is recorded upon selection of said "Outgoing Message Record" mode, whereupon said control circuit means causes an outgoing message recording operation to cycle, by initially establishing the rewind mode of said drive means; when said tape has been rewound to the front end thereof, establishing one of said forward mode and said fast-forward mode and advancing the tape beyond a leader portion thereof; causing said magnetic head means to erase said tape for a predetermined time to create a silent portion free of recorded signals; establishing said forward mode and causing said head to record said outgoing message while said control signal is simultaneously recorded; at the end of said outgoing message, causing said magnetic head means to erase said tape for a predetermined time to create another silent portion; and establishing said stop mode;
   pulse generator means for providing pulses upon rotation of said rotary member;
   counter means for counting said pulses; and
   memory means coupled to the control circuit means and to the counter means for storing the contents of said counter means upon command from said control circuit means; wherein when said "Ready" mode is selected, said rewind mode of said drive means is first established and said tape is rewound to the front end thereof, whereupon said counter means is reset; said fast-forward mode is established and the tape is advanced for a predetermined time; the control circuit means causes said memory means to store the contents of said counter means as a first count and said forward mode is established so that the tape is advanced at normal speed so long as said control signal is reproduced, whereby said magnetic head means reproduces said outgoing meassage; upon termination of the reproduced control signal, said control circuit means causes said memory means to store the contents of said counter means as a second count, and said rewind mode is established so that said tape is rewound until the contents of said counter means equals said first count; and said stop mode is selected so that said telephone answering device is conditioned to stand by to greet incoming calling parties with said recorded outgoing message.

17. In an automatic telephone answering device in which calling parties are greeted by playing of an outgoing message recorded on a track of a magnetic tape wound on a reel, any incoming messages from such calling parties are recorded in sequence on said tape and a control signal is recorded on said tape to indicate the end of said outgoing message; magnetic tape recording and reproducing apparatus comprising:
   magnetic head means for reproducing said outgoing message and for recording said incoming messages on said track of the tape;
   drive means for driving said magnetic tape having a forward mode, a fast-forward mode, a rewind mode, and a stop mode, and having a rotary reel drive mechanism operative to rotate to drive said reel;
   control circuit means coupled to said drive means for selecting one of said forward, fast-forward, rewind, and stop modes;
   pulse generator means associated with said rotary reel drive mechanism for producing pulses upon rotation thereof;
   counter means for counting said pulses;
   control signal detecting means for detecting said control signal to determine the count corresponding to the end of said outgoing message; and
   memory means coupled to the control circuit means and to the counter means for storing the contents of said counter means upon command from said control circuit means to store counts corresponding to the amount of tape advancement at the beginning and at the end of each said recorded incoming message; wherein when an incoming call is received, said control circuit means selects said forward mode so that said magnetic head means reproduces said outgoing message, and when the contents of said counter means equals the count stored in said memory means corresponding to the end of said outgoing message; if there have been no previously-recorded incoming messages said drive means remains in said forward mode and said magnetic head means records the incoming message, but if there have been any previously recorded messages, said control circuit means selects said fast-forward mode and said tape is advanced until the contents of said counter means equals the stored count corresponding to the end of the last such recorded incoming message, after which the control circuit means selects said forward mode so that said magnetic head means records the incoming message; at the end of the incoming message, said memory means stores the count corresponding to the amount of tapes advancement at the end thereof and said control circuit means selects said rewind mode so that said tape is rewound until the contents of said counter means equal the stored count corresponding to the beginning of said outgoing message; and said control circuit means selects said stop mode, thereby conditioning said magnetic tape recording and reproducing apparatus to reproduce said outgoing message to greet subsequent calling parties.

18. In an automatic telephone answering device in which calling parties are greeted by playing of an outgoing message recorded on a track of a magnetic tape wound on a reel, and any incoming messages from such calling parties are recorded in sequence on said track of the tape; magnetic tape recording and reproducing apparatus comprising:

magnetic head means for reproducing said outgoing message and for recording said incoming messages on said track of the tape;
   drive means for driving said magnetic tape having a forward mode, a fast-forward mode, a rewind mode, and a stop mode, and having a rotary reel drive mechanism operative to rotate to drive said reel;
   control circuit means coupled to said drive means for selecting one of said forward, fast-forward, rewind, and stop modes;
   pulse generator means associated with said rotary reel drive mechanism for producing pulses upon rotation thereof;
   counter means for counting said pulses;
   memory means coupled to the control circuit means and to the counter means for storing the contents of said counter means upon command from said control means to store counts corresponding to the amount of tape advancement at the beginning and at the end of each said recorded incoming message; wherein when an incoming call is received, said control circuit means selects said outgoing message, and when the contents of said counter means equals the count stored in said memory means corresponding to the end of said outgoing message; if there have been no previously-recorded incoming messages said drive means remains in said forward mode and said magnetic head means records the incoming message, but if there have been any previously recorded messages, said control circuit means selects said fast-forward mode and said tape is advanced until the contents of said counter means equals the stored count corresponding to the end of the last such recorded incoming message, after which the control circuit means selects said forward mode so that said magnetic head means records the incoming message; at the end of the incoming message, said memory means stores the count corresponding to the amount of tape advancement at the end thereof and said control circuit means selects said rewind mode so that said tape is rewound until the contents of said counter means equal the stored count corresponding to the beginning of said outgoing message; and said control circuit means selects said stop mode, thereby conditioning said magnetic tape recording and reproducing apparatus to reproduce said outgoing message to greet subsequent calling parties; and
   alarm signal generator means coupled to said control circuit means and to said magnetic head means for recording on said tape an alarm signal after the end of each said incoming message, wherein said control circuit means causes at least a portion of said alarm signal to be played back as a go-ahead signal before recording the next incoming message.

19. A method of automatically answering phone calls on a phone line and recording messages from calling parties in sequence on a single magnetic tape with a magnetic tape device having a stop mode, a rewind mode, a forward mode, and a fast-forward mode comprising the steps of:

providing a magnetic tape having recorded thereon an outgoing message and a control signal beginning and ending at the beginning and end of said outgoing message;
   automatically coupling the device to the phone line upon detection of a ringing signal on the phone line;
   setting the device into its forward mode and playing said prerecorded outgoing message;
   detecting the length of advance of said magnetic tape, with values representing the length of advance at the beginning and end of the outgoing message and at the end of any previously recorded incoming message being stored, wherein said stored values representing the lengths of advance at the beginning and end of said outgoing message are determined using the beginning and end of said control signal;
   comparing the length of advance of said magnetic tape with said stored values and when said length corresponding to the end of the outgoing message is reached and if no previous incoming messages have been recorded, recording in said track any incoming message from the calling party, but if there have been previously recorded any such incoming messages, setting said device into its fast-forward mode until the length of advance corresponding to the end of the last such previously-recorded incoming message is detected, and then setting said device into its forward mode and recording the incoming message from the calling party;
   upon termination of the incoming message, storing the value representing the length of advance at the end thereof, and setting the device into its rewind mode;
   detecting said length of advance as said tape is rewound, and comparing said detected length of advance with said stored values; and
   when said detected length of advance corresponds to the stored value representing the beginning of said outgoing message, setting said device into its stop mode, thereby conditioning the device to greet any subsequent calling parties by playing back said recorded outgoing message.

* * * * *